G. P. BUMP.
AIR COMPRESSOR.
APPLICATION FILED NOV. 16, 1915. RENEWED JULY 25, 1918.
1,294,869.
Patented Feb. 18, 1919.
3 SHEETS—SHEET 3.
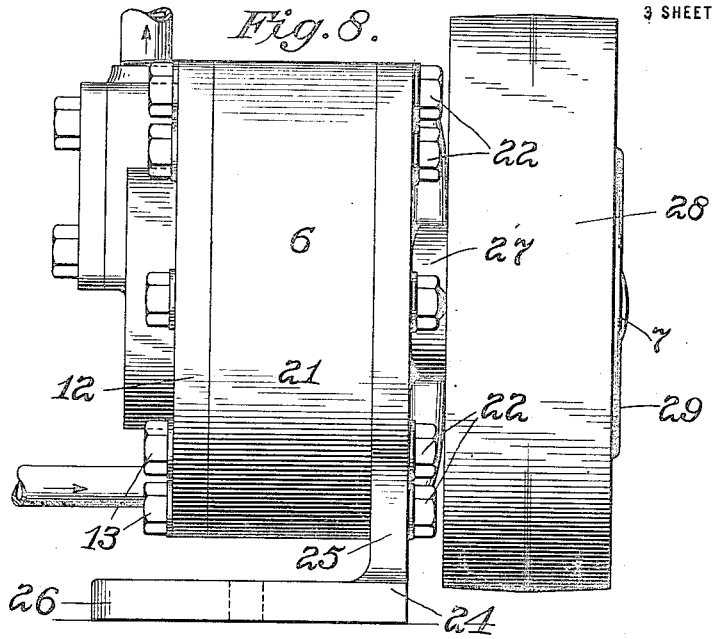
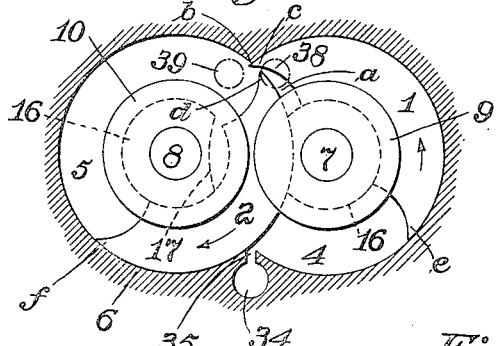
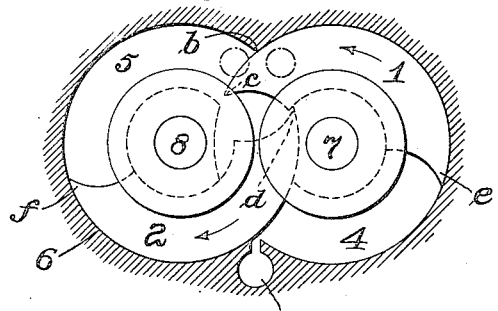
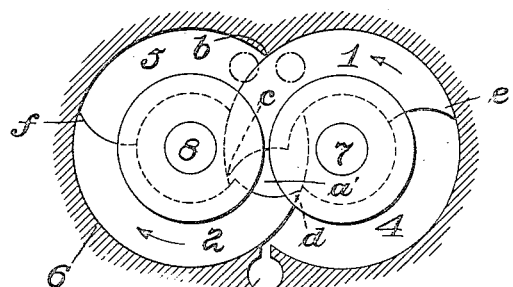
Inventor:
George P. Bump,
Att'ys.

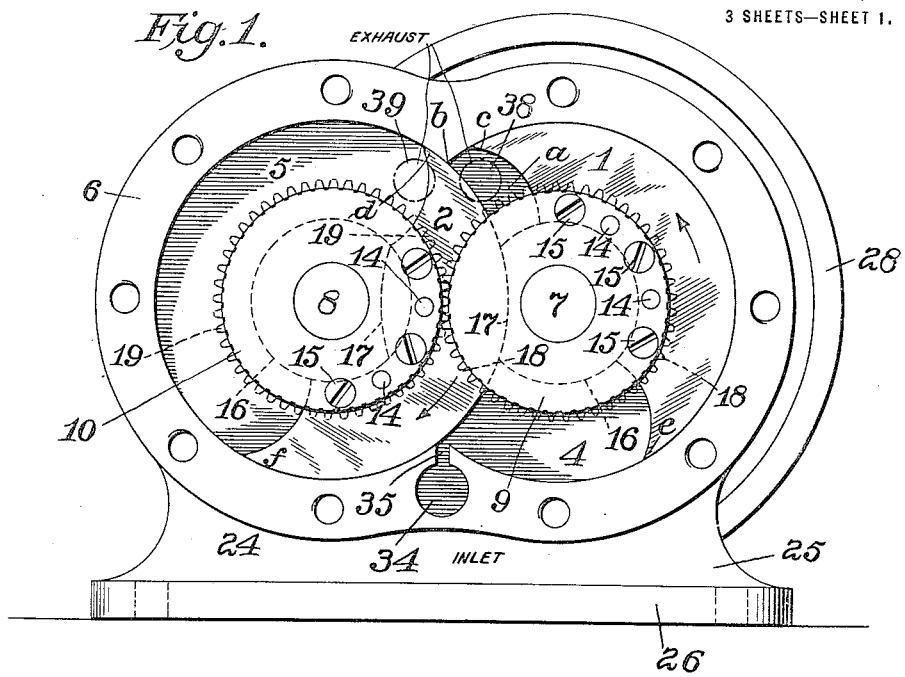
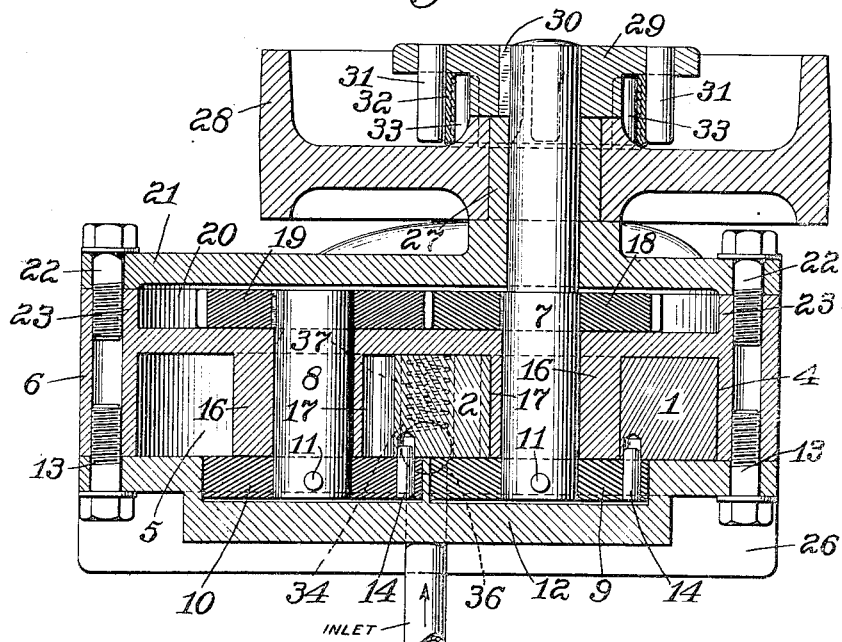

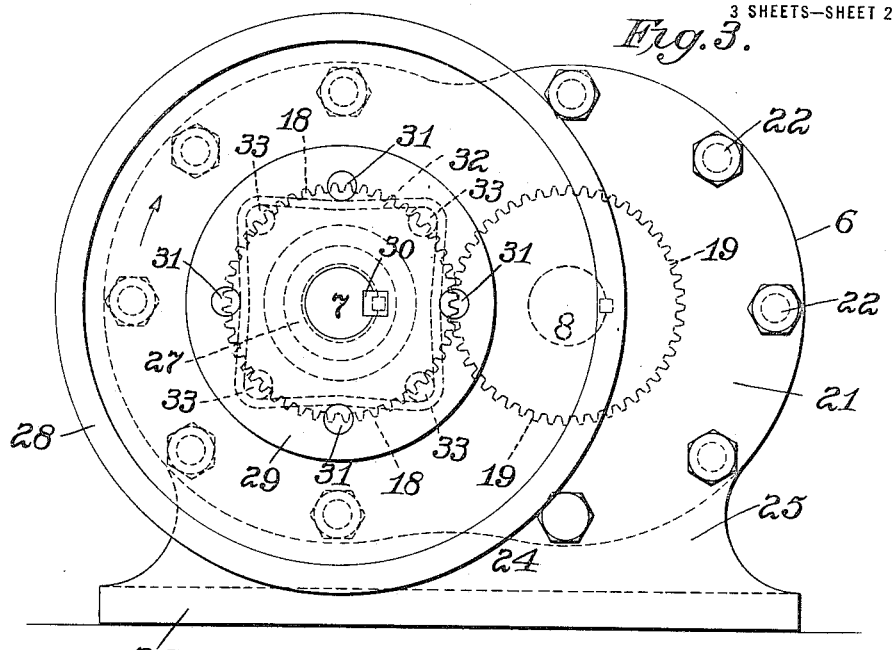
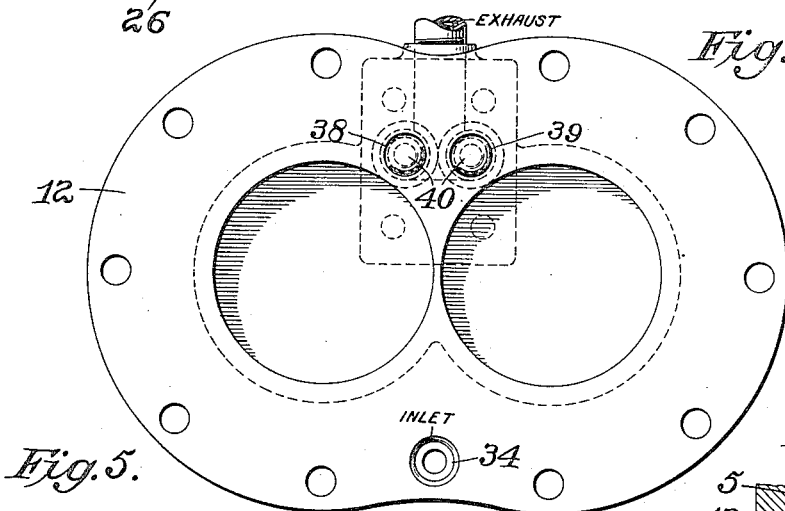
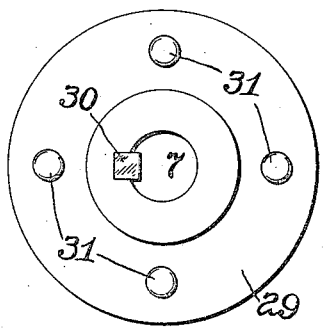
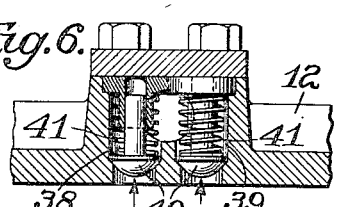
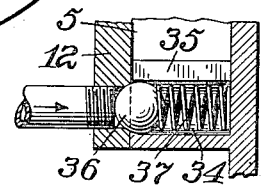

UNITED STATES PATENT OFFICE.

GEORGE P. BUMP, OF LA CROSSE, WISCONSIN.

AIR-COMPRESSOR.

1,294,869. Specification of Letters Patent. Patented Feb. 18, 1919.

Application filed November 16, 1915, Serial No. 61,793. Renewed July 25, 1918. Serial No. 246,780.

*To all whom it may concern:*

Be it known that I, GEORGE P. BUMP, citizen of the United States, residing at La Crosse, Wisconsin, have invented certain new and useful Improvements in Air-Compressors, of which the following is a specification.

My invention is particularly designed for pumping air, but the invention as to some of its features is applicable for use in a rotary engine.

The invention consists in the features and combination and arrangement of parts hereinafter described and particularly pointed out in the appended claims.

In the drawings

Figure 1 is a side elevation of a pump embodying the invention, one of the side plates being removed to show the interior parts;

Fig. 2 is a sectional view, the section being taken horizontally through the axes of the revolving pistons;

Fig. 3 is a side view looking from the side opposite to that shown in Fig. 1;

Fig. 4 is a side view of a cover plate looking from the opposite direction as in Fig. 1;

Fig. 5 is a detail side view of the driving head or disk;

Figs. 6 and 7 are detail sectional views illustrating respectively the exhaust and inlet valves;

Fig. 8 is an end view of the pump;

Figs. 9, 10 and 11 are diagrammatic views.

In these drawings, 1, 2, indicates the two rotary pistons of the pump. Each of these is of segmental form, and each rotates within its own chamber 4, 5, of the main casing 6. These chambers intersect at the central line of the casing.

The pistons are mounted upon shafts 7, 8, journaled in the main casing, and for securing the pistons to their shafts I employ disks 9, 10, pinned to the shafts at 11 and located in an offset portion of the casing formed by the recessed head plate 12 which is secured to the main casing 6 by the bolts 13. The disks 9 and 10 and the pistons 1, 2, are formed separately and are secured together by pins 14 and screws 15.

The pistons turn about the central bearings 16 cast integrally with the main frame 6, these bearings being for the most part of cylindrical shape, but having their adjacent faces or sides cut away at 17 on the arcs of circles whose radii equal those of the segmental pistons, each of these cut away parts being adapted to receive the peripheral surface of the segmental piston belonging to the other cylinder or chamber, the running fit being close enough to cut off the passage of air between the surface of this bearing and the curved face of the piston. The pistons are similarly disposed in respect to their angular position relative to their shafts, that is to say, if both are in the same vertical position they would lie on the same side of their respective shafts and in like positions in relation thereto. They are geared together to rotate in opposite directions by gears 18, 19, on their shafts, said gears working in a chamber 20 formed by a head 21 bolted at 22 to a flange 23 of the main casing. This head forms a part of the main bracket 24 which supports the whole pump structure, the bracket including in its structure the downward extension 25 of this head and the horizontal base or foot plate 26.

This bracket or main supporting part has a laterally extending bearing 27 for the shaft 7 which is the drive shaft, and on the outer side of this bearing 27 the pulley 28 is mounted and turns.

A flexible connection is employed for communicating power from the pulley to the shaft for the purpose of eliminating side thrust on the shaft 7 which otherwise would result from the pull of the belt.

This flexible connection consists of a head or disk 29 keyed at 30 to the shaft 7, and having a series of pins 31, four in the instance shown, which bear upon the outer side of a flexible band 32 which band bears upon pins 33 on the inner side of said band said pins being carried by the pulley 28.

An important feature of my invention consists in the employment and arrangement of the inlet and exhaust ports with check valves at the same. The inlet opening for the air is shown at 34 arranged at the lower part of the casing and in the same vertical plane at which the two cylinder chambers 4 and 5 meet or merge, as shown in Fig. 1. This inlet port is bored parallel with the axes of the pistons, and it connects with the chambers by a narrow slot or opening 35 extending across the casing throughout the width of the chamber.

This inlet is provided with a check valve 36 which may be of various forms, but in the present instance it is shown as a ball pressed by a spring 37 so arranged to allow the air to flow in, but prevent its exit from the chamber at this point. The exhaust ports 38, 39, are formed in the side or head 12, and these also are bored parallel with the axes of the pistons and chambers. Puppet forms of check valves 40 control these ports under pressure of springs 41, as shown in Fig. 6.

One of these exhaust ports with its check valve is used on each side of the vertical center of the frame or casing, one leading from the piston chamber 4 and the other from the piston chamber 5.

Referring to Fig. 1, and supposing the pistons are rotating in the arrow direction: Air is passing into the chamber 4 in rear of the piston 1 through the inlet port 34 at the same time that air is being compressed in the space $a$ between the upper ends or horns of the pistons 1 and 2, and is being discharged through the right hand exhaust port, the check valve of the left hand exhaust port being closed under its spring and the back pressure. The further movement of the pistons will make them assume the positions shown in Fig. 9, from which it will be seen that the horn or point of the piston 2 has left the bearing surface of the chamber or cylinder and thrown the space $a$ containing compressed air into communication with the chamber 5, which contains the fresh charge of air. As a result of this, the remaining compressed air in the space $a$, or the surplus which has not passed through the outlet valve, or that which is compressed by the said further movement of the pistons is transferred to the other space or chamber 5, and raises the pressure in this chamber, so that instead of having the fresh charge of air in chamber 5 under atmospheric pressure prior to the time that the pistons act thereon to compress it, we have air at an initial pressure considerably higher than the atmosphere, and it will be understood that this compounding action or raising of the initial pressure in the chamber, as 5, prior to the compressing action of the pistons thereon will increase the higher the pressure is in the tank. It will be understood that this compounding action or transfer of pressure from the space $a$ to the chamber 5 as just described depends largely upon the use of the check valve at the exhaust which closes under back pressure as soon as the space $a$ is thrown into communication with the chamber 5 and thus allows the transfer of pressure to be effected from space $a$ to chamber 5.

It will be noted as above stated that I employ an exhaust port and check valve individual to each chamber 4, 5, and these are located on opposite sides of the vertical center line of pump. By reason of this the right hand port will be in service to a maximum degree during the whole time that compression is taking place in the space $a$ and until the horn $d$ of the piston 2 reaches and passes beyond the center line at the point $b$.

Referring to Figs. 10 and 11, it will be observed that as the piston continues in revolution the forward horn $c$ of piston 1 will trap some of the higher pressure air in chamber 5 between itself and the horn $d$ of the piston 2, this trapped air under pressure higher than atmospheric being in the space $a'$. Now, when horn $d$ begins to leave the concave face of bearing 16 and thus throws space $a'$ into communication with the chamber 4 which is still taking in air due to the revolution of the piston 1, this air compressed as above stated will be transferred to the chamber 4 and raise the pressure in said chamber before the pistons perform their main action thereon. At the time this air above atmospheric pressure is transferred from space $a'$ to chamber 4, the inlet check valve will close and prevent the escape of this air which, as stated, is under initially higher pressure than that of the atmosphere. It will be understood, of course, that similar actions to those described in connection with the horns $c$, $d$, of the pistons take place in connection with the other horns $e$, $f$, of the pistons.

The exhaust valves as before stated operate in a direction parallel to the axes of the pistons, and are located in the head 12. By reason of this they can be located close to the piston chambers, and thus there will be practically no air space on the working side of the said valves excepting the space $a$ in which compression takes place.

In other words, the arrangement described enables the exhaust valve to be placed as near the compression space lying between the pistons as possible.

It is of advantage to make the pistons separate from their carrying disks 9, 10, for not only can the two pistons be made from the same casting and turned and bored as one piece, but by dropping the pistons into their chambers the side face of the pistons and casing can be ground off at one operation and then the pistons and their disks can be attached.

The gearing is inclosed by the head or standard 21, and the other head 12 forms a complete closure for the other side of the pump. Only the shaft 7 extends outside the casing, and this is journaled in a long bearing 27 on the head 21. No stuffing boxes are employed.

By using the flexible connection between the shaft 7 and pulley, and by mounting said pulley on the outside of the fixed bearing 27, no side thrust is brought upon the shaft and there is no tendency to throw the pistons out of their true working planes.

Oil or grease is dropped to the gear covering or chamber which, besides serving as a lubricant, seals the chamber against the escape of air. Oil is also introduced into the working chambers to lubricate all the parts and seal them against the escape of air.

From the above it will be seen that each charge of air which is drawn in at atmospheric pressure is raised initially in pressure, that is, prior to the compressing action of the pistons thereon, by the transfer of air from the compression space between the pistons, or by trapping a part of the air from one chamber and transferring it to the other.

I claim as my invention:—

1. In combination in apparatus for compressing air, a pair of rotating segmental pistons, a pair of chambers or cylinders which intersect and in which the pistons rotate, parallel shafts on which the pistons are mounted, each of said pistons having a path of rotation intersecting the path of rotation of the other piston and said pistons acting alternately to compress the air in the space between its cut-away face and the cylindrical face of the opposing piston, an inlet for the air adjacent the point of juncture of the two cylinders, a check valve at said inlet opening inwardly toward the interior of the cylinder, outlet means adjacent the juncture of the two cylinders and on the opposite side thereof from where the inlet is located, check valve means opening outwardly at said outlet in respect to the cylinder, each piston, after having the air compressed against its cylindrical side, serving to throw the compression space between the pistons into communication with the space within its cylinder containing the fresh charge of air to augment the pressure thereof just before compression of said fresh charge takes place, substantially as described.

2. In combination in apparatus for compressing air, a pair of rotating segmental pistons, a pair of chambers or cylinders which intersect and in which the pistons rotate, parallel shafts on which the pistons are mounted, each of said pistons having a path of rotation intersecting the path of rotation of the other piston and said piston acting alternately to compress the air in the space between its cut-away face and the cylindrical face of the opposing piston, an inlet for the air adjacent the point of juncture of the two cylinders, a check valve at said inlet opening inwardly toward the interior of the cylinder, outlet means adjacent the juncture of the two cylinders and on the opposite side thereof from where the inlet is located, check valve means opening outwardly at said outlet in respect to the cylinder, each piston, after having the air compressed against its cylindrical side, serving to throw the compression space between the pistons into communication with the space within its cylinder containing the fresh charge of air to augment the pressure thereof just before compression of said fresh charge takes place, said outlet means consisting of two ports, one for each cylinder, located on opposite sides of the point of juncture of the cylinders, said ports, with their check valves, acting alternately for the discharge of compressed air from the space between the pistons, and both check valves acting to prevent back pressure of the air when compressed air is transferred from said compression space to the space of the other cylinder containing the fresh charge of air to be compressed, substantially as described.

3. In combination in apparatus for compressing air, a pair of rotating segmental pistons having cut-away portions forming horns, a pair of cylinders or chambers which intersect and in which the pistons rotate, parallel shafts on which the pistons are mounted, each piston having a path of rotation intersecting that of the opposing piston and said pistons acting alternately to compress the air in a compression space between one of its horns and the cylindrical face of the other piston, and acting alternately to open communication between said compression space and the space in the other cylinder containing the fresh air supply to augment the pressure thereof and said pistons acting thereafter to trap some of said pressure augmented fresh charge of air between their horns, to deliver the same to the fresh charge of air in the other cylinder and a check valved air inlet and a check valved air outlet, substantially as described.

In testimony whereof, I affix my signature in presence of two witnesses.

GEORGE P. BUMP.

Witnesses:
 Ewd. L. Tolson,
 Bennett S. Jones.